(12) United States Patent
Tushinskiy (10) Patent No.: US 11,164,215 B1
(45) Date of Patent: Nov. 2, 2021

(54) CONTEXT-BASED VOICE-RELATED ADVERTISEMENT OFFERS

(71) Applicant: INSTREAMATIC, INC., San Francisco, CA (US)

(72) Inventor: Stanislav Tushinskiy, Mountain View, CA (US)

(73) Assignee: INSTREAMATIC, INC., San Francisco, CA (US)

( * ) Notice: Subject to any disclaimer, the term of this patent is extended or adjusted under 35 U.S.C. 154(b) by 0 days.

(21) Appl. No.: 17/060,149

(22) Filed: Oct. 1, 2020

(51) Int. Cl.
*G06Q 30/00* (2012.01)
*G06Q 30/02* (2012.01)

(52) U.S. Cl.
CPC ..... *G06Q 30/0271* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 10,096,319 | B1* | 10/2018 | Jin | G10L 25/66 |
| 10,522,146 | B1* | 12/2019 | Tushinskiy | G10L 15/22 |
| 10,528,977 | B1* | 1/2020 | Jogia | G06Q 30/0641 |
| 10,531,157 | B1* | 1/2020 | Loritsch | G06F 3/165 |
| 10,614,487 | B1* | 4/2020 | Tushinskiy | G10L 15/22 |
| 10,714,081 | B1* | 7/2020 | Miller | G10L 15/08 |
| 11,050,499 | B1* | 6/2021 | Tushinskiy | H04H 60/33 |
| 2014/0172545 | A1* | 6/2014 | Rabkin | G06Q 30/0269 705/14.44 |
| 2019/0220889 | A1* | 7/2019 | Wei | G06Q 30/0255 |
| 2020/0019979 | A1* | 1/2020 | Truong | G06F 16/283 |
| 2020/0058053 | A1* | 2/2020 | Seko | G06Q 30/0255 |
| 2020/0334712 | A1* | 10/2020 | Balasubramanian | G06Q 30/0257 |
| 2020/0380981 | A1* | 12/2020 | Tom | G10L 15/22 |

* cited by examiner

*Primary Examiner* — Meredith A Long
(74) *Attorney, Agent, or Firm* — Georgiy L. Khayet (57) ABSTRACT

Methods and systems for providing context-based voice-related advertisement offers are provided. An example method may include receiving, via a sensor of a user device, a voice command of a user; determining, based partially on the voice command, a context; and sending, via the user device, the context to a remote advertisement platform, wherein the remote advertisement platform is configured to determine, based on the context, an advertisement offer for the user and send the advertisement offer to the user device, causing the user device to play back the advertisement offer; determining, via the sensor of the user device, a reaction of the user to the advertisement offer, and in response to the reaction of the user, providing, via the user device to the remote advertisement platform, information concerning the reaction of the user.

20 Claims, 5 Drawing Sheets

CONTEXT-BASED VOICE-RELATED ADVERTISEMENT OFFERS

TECHNICAL FIELD

This disclosure generally relates to the field of providing advertisements. More particularly, this disclosure relates to methods and systems for providing context-based voice-related advertisement offers.

BACKGROUND

Voice assistants are widely used in user devices, such as smart television sets, computers, tablets, and smart assistant devices. The voice assistants allow users to interact with a user device to start media applications, control smart devices and home appliances, request information regarding weather, provide information concerning goods and services, and so forth. In some instances, the information provided by voice assistants to the user is either limited or irrelevant with respect to a user request, so the user may not be able to access best offers concerning the goods and services. There is a need for a convenient way to deliver relevant offers for goods and service to users.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

This present disclosure is directed to systems and methods for providing context-based advertisement offers. Some embodiments of the present disclosure may facilitate providing advertisement offers to a user of a user device based on a context of an interaction of the user with a voice assistant of the user device.

According to an example embodiment, a method for providing context-based advertisement offers is disclosed. The method may include receiving, via a sensor of a user device, a voice command of a user. The method may include determining a context, based partially on the voice command, and sending, via the user device, the context to a remote advertisement platform. The remote advertisement platform can be configured to determine, based on the context, an advertisement offer for the user and send the advertisement offer to the user device. The method may include causing the user device to play back the advertisement offer. The method can include determining, via the sensor of the user device, a reaction of the user to the advertisement offer. The method may include, in response to the determining the reaction of the user, providing, via the user device to the remote advertisement platform, information concerning the reaction of the user.

Determining a reaction of the user to the advertisement offer include determining, via the sensor of the user device one of the following: a voice confirmation of the user to accept the advertisement offer, a voice response of the user to reject the advertisement offer, and absence of a further voice command of the user during a pre-determined time after the advertisement offer has been played.

The voice command can be related to a media stream application installed on the user device. The context can be related to one or more of the following: a name of the media stream application, a type of media content to be played via the media stream application, and a title of the media content. The context may include data concerning an environment background captured by the sensor of the user device.

The determining context may include determining, based on the voice command of the user, one of the following: an emotional level of the user, a range of an age of the user, a gender of the user, and data concerning a health status of the user. The determination of the context may include determining a fingerprint of the voice. The determination of the fingerprint may include comparing the fingerprint to a previous fingerprint determined based on a previous voice command received in a response to previous advertisement offers. The determination may include recognizing the user based on the results of the comparison.

The method may include determining, based on the reaction of the user, that the user has rejected the advertisement offer. In response to the rejection, the method may include causing the user device to play back a question concerning a reason for the rejection of the advertisement offer. The method may include capturing, via the sensor of the user device, a user response to the question. The method may include sending, via the user device to the remote advertisement platform, the user response. The remote advertisement platform can be configured to adjust, based on the user response, an algorithm for selection of the advertisement offer.

The determining the reaction of the user to the advertisement offer may include capturing, via the sensor of the user device, a voice response of the user. The information concerning the reaction of the user may include the voice response.

The determining the reaction of the user to the advertisement offer may include capturing, via the sensor of the user device, a voice response of the user. The determining the reaction may include recognizing a text in the voice response. The information concerning the reaction of the user may include the recognized text.

The user device includes one of the following: a smart television set, a media streaming device, a smart home device, and a smart home assistant device, a car with a voice assistant system, a personal computing device including the voice assistant system, a smartphone, and the like.

The advertisement offer may include one or more of the following: an audio record, a companion text, a companion display banner, and a companion video.

According to another embodiment, a system for providing context-based advertisement offers is disclosed. The system may include at least one processor and a memory storing processor-executable codes, wherein the at least one processor can be configured to implement operations of the above-mentioned method for providing context-based advertisement offers upon execution of the processor-executable codes.

According to yet another aspect of the disclosure, there is provided a non-transitory processor-readable medium, which stores processor-readable instructions. When the processor-readable instructions are executed by a processor, they cause the processor to implement the above-mentioned method for providing context-based advertisement offers.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The technology described herein is concerned with systems and methods for providing context-based advertisement offers. Some embodiments of the present technology may facilitate providing advertisement offers to a user when the user interacts with a user device via a voice assistant. The advertisement offers provided to the user can be selected from a database of the advertisement offers based on relevance of the advertisement offers to the context of the interaction of the user with the voice assistant.

According to an example embodiment of the present disclosure, a system for providing context-based advertisement offers is disclosed. The system may include one or more processors and a memory storing an advertisement module comprising processor-executable codes. Upon executing the processor-executable codes, the processors can be configured to receive, via a sensor of a user device, a voice command of a user. The processors can determine, based partially on the voice command, a context. The processors can send, via the user device, the context to a remote advertisement platform. The remote advertisement platform is configured to determine, based on the context, an advertisement offer for the user and send the advertisement offer to the user device. The processors can cause the user device to play back the advertisement offer. The processor can determine, via the sensor of the user device, a reaction of the user to the advertisement offer. In response to the reaction of the user, the processor may provide, via the user device to the remote advertisement platform, information concerning the reaction of the user.

Figure 1:
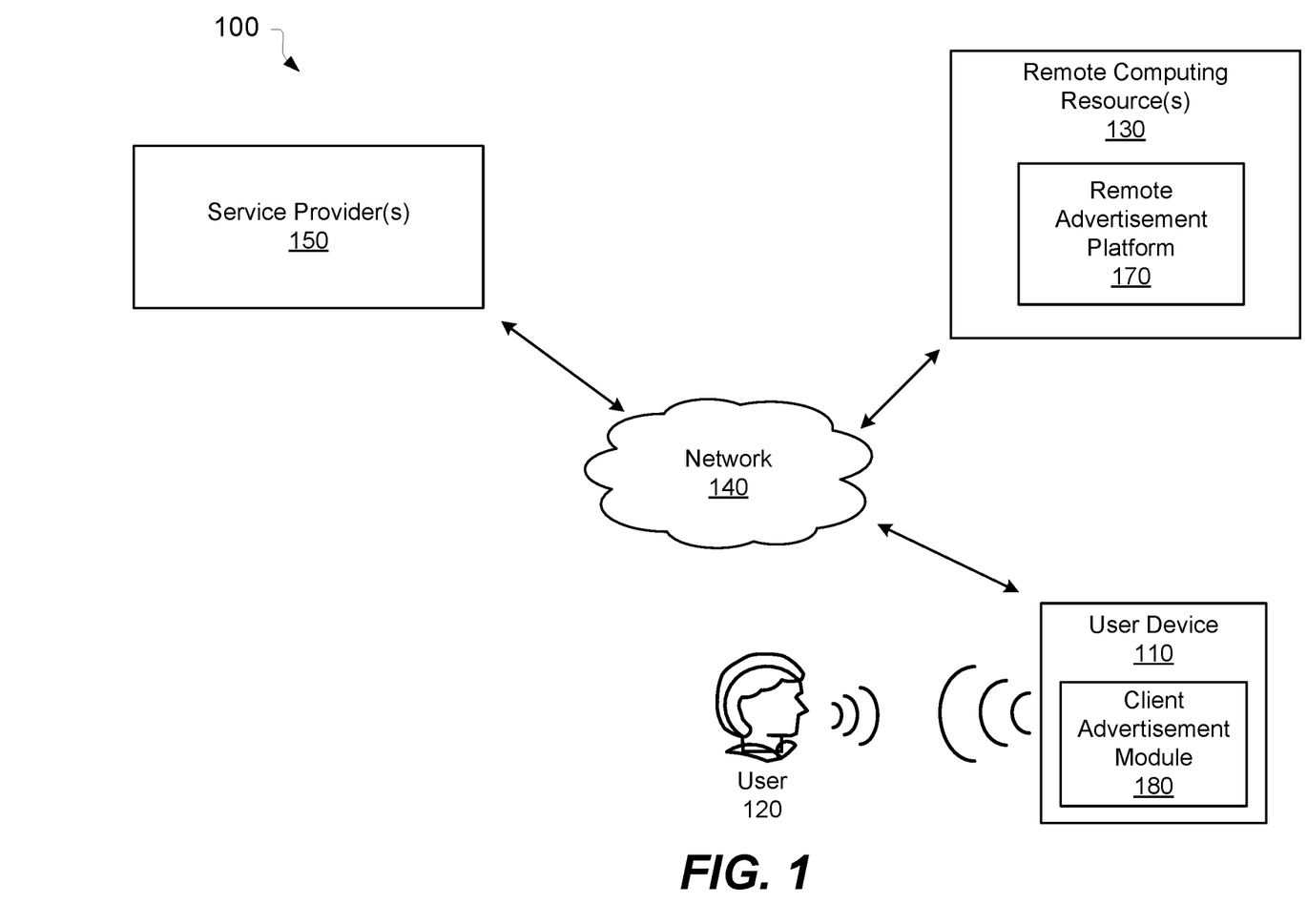
FIG. 1 is a block diagram showing an example environment wherein a method for providing context-based advertisement offers during an advertisement can be implemented.

Referring now to the drawings, FIG. 1 shows an example environment 100, wherein a method for providing context-based advertisement offers can be implemented. The environment 100 may include a user device 110, a user 120, a remote computing resource(s) 130, network 140, and service provider(s) 150.

The user device 110 can include radio frequency receivers, transmitters, and transceivers, wired and/or wireless telecommunications and/or networking devices, amplifiers, audio and/or video players, encoders, decoders, speakers, inputs, outputs, storage devices, and user input devices. The user device 110 can be configured to receive a media stream and play the media stream to a user using an output device (for example, speakers and earphones). The user device 110 can be configured to sense ambient acoustic sound using, for example, one or more microphones. The user device 110 can be configured to detect the voice of the user 120. The user device 110 may include, but is not limited to, a notebook computer, a desktop computer, a tablet computer, a phablet, a smart phone, a personal digital assistant, a media player, a mobile telephone, a smart television set, in-vehicle infotainment, a smart home device, a car with a voice assistant system, a personal computing device including the voice assistant system, a smartphone, and the like. In general, the user device 110 may include any device having a voice assistant system. An example user device 110 is described in detail in FIG. 2.

In some embodiments, the user device 110 may include a communication unit to receive media streams via one or more media stream players. In certain embodiments, the media stream can be delivered using a data network 140. The data network 140 can refer to any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), Bluetooth™ radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, the data network 140 includes a corporate network, data center network, service provider network, mobile operator network, or any combinations thereof.

In some embodiments, the remote computing resource(s) 130 may be implemented as server(s) or cloud-based computing resource(s) shared by multiple users. The remote computing resource(s) 130 can include hardware and software available at a remote location and accessible over the network 140. The remote computing resource(s) 130 can be dynamically re-allocated based on demand. The cloud-based computing resources may include one or more server farms/clusters including a collection of computer servers that can be co-located with network switches and/or routers.

The remote computing resource(s) 130 may include a remote advertisement platform 170. The user device 110 may include a client advertisement module 180. The client advertisement module 180 can be configured to track verbal communications of the user 120 with the user device 110 and determine context of the verbal communications. The context can be further provided to the remote advertisement platform 170. Based on the context, the remote advertisement platform 170 can be configured to select an advertisement offer for the user 120. The advertisement offer can be selected from advertisement offers provided by service provider(s) 150. The remote advertisement platform 170 can send the advertisement offer to the user device 110. The client advertisement module 180 may play the advertisement offer via output devices of the user device 110. The client advertisement module 180 can determine, via acoustic sensors of the user device 110, a reaction of the user to the advertisement offer. The client advertisement module 180 may provide information concerning the reaction of the user to the remote advertisement platform 170. If the reaction of the user 120 is to accept the advertisement offer, then the remote advertisement platform 170 may send information concerning the reaction of the user to the service provider(s) 150 to complete an order concerning the advertisement offer.

In some embodiments, the service provider(s) 150 can include remote computing resource(s) associated with various commercial and non-commercial organizations. The remote computing resource(s) can be used for sending advertisement offers to the remote advertisement platform 180. The advertisement offer may include suggestions for ordering different products and services. The remote advertisement platform 180 can be configured to store the advertisement offers for a pre-determined time and determine contexts of the advertisement offers. The context of the advertisement offers can be matched to the context of the verbal conversation of the user 120 and the user device 110 to determine an advertisement offer suitable for the user.

Figure 2:
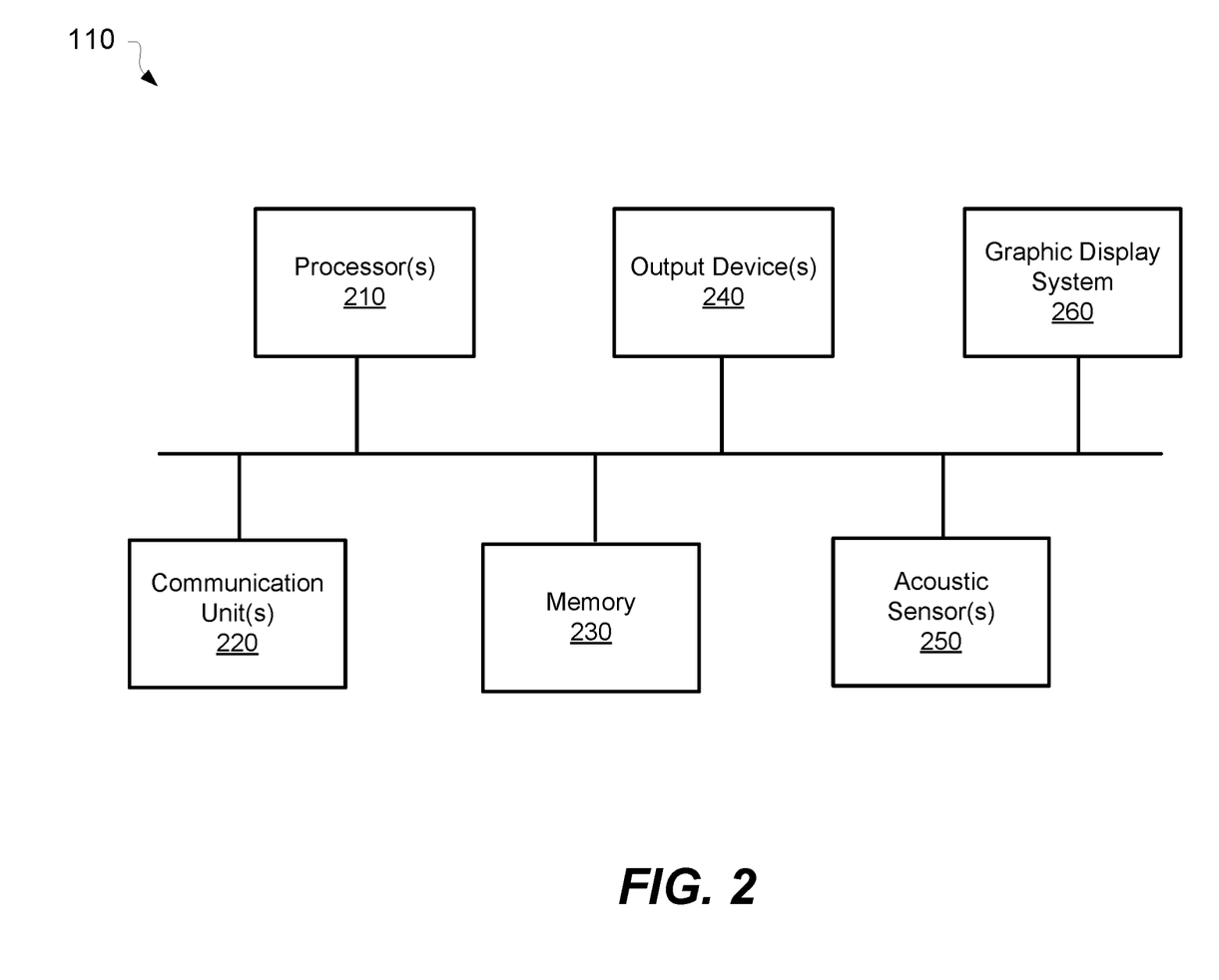
FIG. 2 is a block diagram showing a user device suitable for implementing a method for providing context-based advertisement offers, according to an example embodiment.

FIG. 2 is a block diagram showing a user device 110 suitable for implementing a method for context-based advertisement offers, according to an example embodiment. FIG. 2 provides details of the user device 110 of FIG. 1. In the illustrated embodiment, the user device 110 includes one or more processor(s) 210, one or more communication unit(s) 220, memory 230, one or more output device(s) 240, one or more acoustic sensor(s) 250, and a graphic display system 260. In other embodiments, the user device 110 includes additional or other components necessary for operations of user device 110. Similarly, in certain embodiments, the user device 110 includes fewer components that perform functions similar or equivalent to those depicted in FIG. 2.

In various embodiments, the processor(s) 210 include hardware and/or software, which is operable to execute instructions stored in the memory 230. The processor(s) 210 may perform floating point operations, complex operations, and other operations, including performing speech recognition based on ambient acoustic signals captured by acoustic sensor(s) 250 to detect verbal communication between user 120 and a voice assistant of the user device 110 and analyzing the verbal communication to detect keywords and context associated with verbal communication. The processors 210 may include general purpose processors, video processors, audio processing systems, and so forth.

In various embodiments, the communication unit(s) 220 can be configured to communicate with a network such as the Internet, WAN, LAN, cellular network, and so forth, to receive audio and/or video data of media streams. The received audio and/or video data may be then forwarded to the processor(s) 210 and the output device(s) 240.

The acoustic sensor(s) 250 can include one or more microphones. The processors 210 can be configured to receive acoustic signals from an acoustic source, for example the user 120, via acoustic sensor(s) 250 and process the acoustic signal to determine presence of keywords and commands in a voice of the user 120. The acoustic sensor(s) 250 can be spaced a distance apart to allow the processor(s) 210 to perform a noise and/or echo reduction in received acoustic signals.

In some embodiments, the output device(s) 240 may include any device which provides an audio output to a listener (for example, the user 120). The output device(s) 240 may comprise one or more speaker(s), an earpiece of a headset, or a handset.

In various embodiments, the graphic display system 260 can be configured to provide a graphic user interface. In some embodiments, a touch screen associated with the graphic display system 260 can be utilized to receive an input from a user. The graphic display system 260 may be configured to display a video content of the media stream and advertisements.

Figure 3:
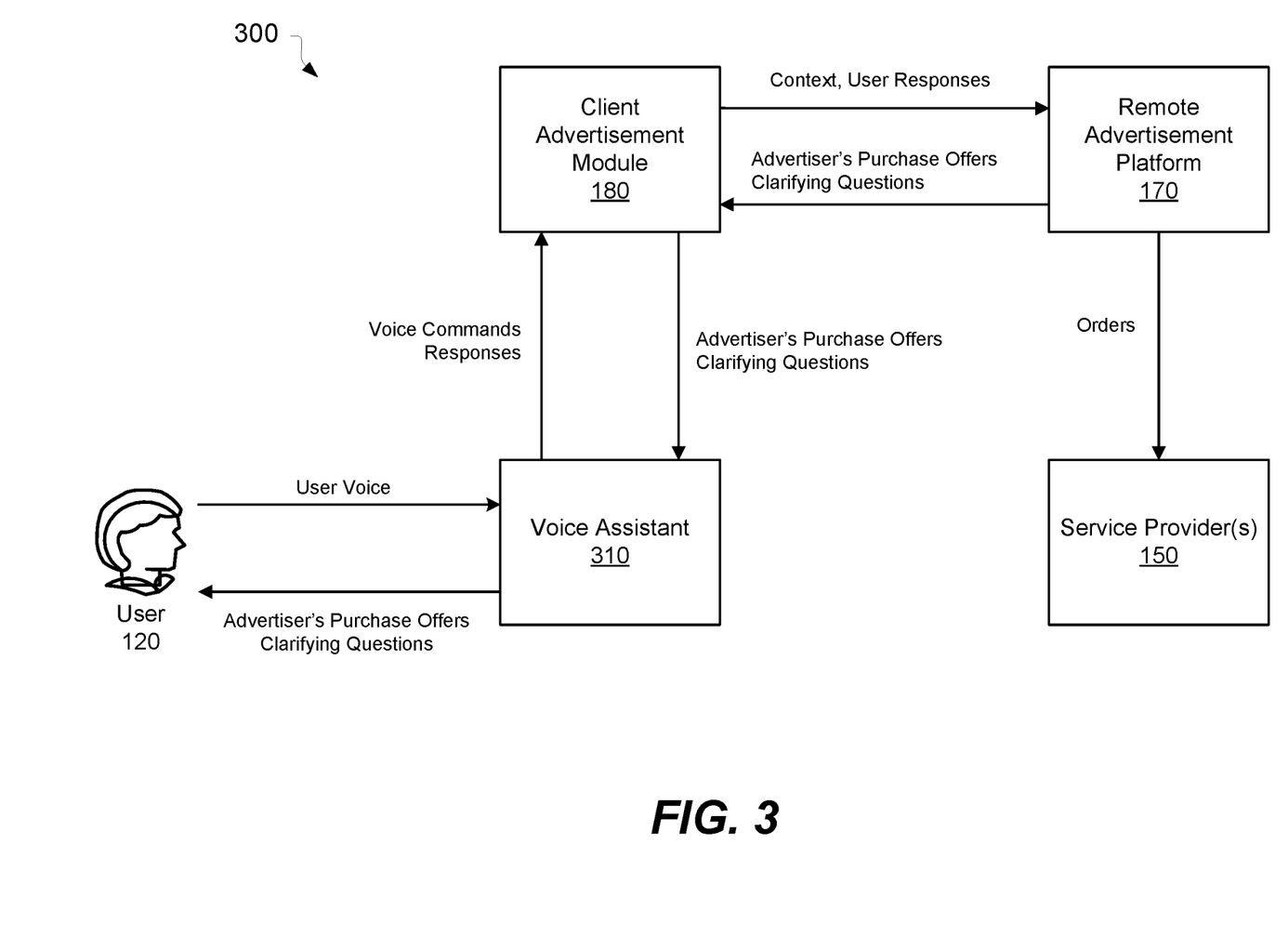
FIG. 3 is a block diagram illustrating an example system for providing context-based advertisement offers, according to an example embodiment.

FIG. 3 is a block diagram illustrating an example system 300 for providing context-based advertisement offers, according to an example embodiment. The system 300 may include a voice assistant 310, the client advertisement module 180, the remote advertisement module 170, and service provider(s) 150. In certain embodiments, the voice assistant 310 and the client advertisement module 180 can be implemented as instructions stored in memory 230 of user device 110 and executed by processor(s) 210 (shown in FIG. 2). In some embodiments, the client advertisement module 180 can be built into the voice assistant 310. The remote advertisement module 170 can be implemented as one or more applications of the remote computing resource(s) 130.

The voice assistant 310 may detect a presence of a voice of the user 120 in the ambient acoustic signal and analyze the voice of the user 120 to detect a presence of a voice command in the voice of the user. The voice command may include one or more key phrases, such as "Start Netflix," "Play an NHL game," "Play a movie," "Open the website," "Make a note," "Make a reminder," and so forth. The voice assistant 310 can be configured to recognize similar key phrases pronounced in various languages. The voice assistant 310 may provide the recognized voice command either in text format or audio format to the client advertisement module 180.

The client advertisement module 180 may determine, based on the voice command of the user 120, a context associated with the voice command. In an example embodiment, the user may pronounce "please show me a TV series." In this case, the context is "the user wants to watch a TV series". The client advertisement module 180 sends the context to the remote advertisement platform 170. The remote advertisement platform 170 may select, from advertisement offers currently stored at remote advertisement platform 170, an advertisement offer relevant to the context "the user wants to watch a TV series." For example, the advertisement offer may be associated with a pizza delivery. The advertisement offer can be sent to client advertisement module 180. The client advertisement module 180 may cause the voice assistant 310 to play the advertisement offer concerning the pizza delivery (for example, "Do you want to order a pizza?"). If the user states that he or she is interested in the advertisement offer, for example if the user responds "Yes, please," then the client advertisement module 180 may send an indication that the user 120 confirmed the advertisement offer to the remote advertisement platform 170. The client advertisement module 180 may also send, to the remote advertisement platform 170, payment information, phone number, and address stored in the user device. The remote advertisement platform 170 may further send the order to a service provider, for example, to an online order portal of a pizza delivery company to proceed the order.

In various embodiments, the advertisement offer may include one or more of the following: an audio record, a text including one or more links, a QR code, a companion display banner, a companion video, and the like. The audio record and companion video can be pre-recorded. Alternatively, the audio record and companion video can be synthesized by an artificial intelligence (AI) system. The advertisement offer including video may be provided via a display of the user device 110. Some of the advertisement offers may include video or text information only. Other advertisement offers may include audio content only.

The determination of the context can be also based on previous voice commands and previous preferences of the user 120. For example, if user voice command is "Show me a movie", then the voice assistant 310 may provide the voice command of the user to the client advertisement module 180. The client advertisement module 180 may determine the context "the user wants to watch a movie" and send the context to the remote advertisement platform 170. The remote advertisement platform 170 may store previous user preferences about the context "user wants to watch a movie" and may provide to the client advertisement module 180 an offer regarding the pizza: "Do you want to order another pizza?" or "The last time you watched a movie you ordered a pizza. Do you want another pizza and a pack of beer?".

In another example, the user 120 may ask the user device (for example, the user's smartphone) "Where is the nearest coffee shop?". The voice assistant 310 of the user device may provide the location of the nearest coffee shop. At the same time, the client advertisement module 180 may sent the context "the user asked for location of a coffee shop" to the remote advertisement platform 170. The user advertisement platform 170 may select an advertisement offer from a coffee shop other than the one suggested by the voice assistant 310 (for example: "Another coffee shop is 2 minutes longer to drive, but you will receive a discount") and send a discount code or coupon to the user device.

Upon determining that the user 120 has confirmed an advertisement offer, the client advertisement module 180 may ask the user 120, via the voice assistant 310, to provide clarifying information. For example, the client advertisement module 180 may ask the user 120 to provide an address where to deliver the order. The client advertisement module 180 may also explicitly ask the user 120 to confirm payment via one or more payment methods installed in the user device.

The client advertisement module 180 may determine that user 120 has rejected an advertisement offer. For example, the client advertisement module 180 may determine that the user 120 has pronounced "No, thank you" or a similar phrase. The client advertisement module 180 may determine that user 120 has rejected the advertisement offer if no user response is detected during a predetermined time after the advertisement offer has been played back. In these cases, the client advertisement module 180 may ask clarifying questions regarding the advertisement offer, for example, "Is the moment for receiving advertisements not right?" or "Do you not like receiving the advertisement of this type?". If the client advertisement module 180 detects that user 120 responds to the clarifying questions, then the user's response can be sent (either in text format or audio format) to the remote advertisement platform 170. The remote advertisement platform 170 may update a user profile, based on the user's response, and adjust an algorithm for selecting advertisement offers.

The context of voice communications between the user 120 and the voice assistant 310 can be determined based on information concerning a specific application the user request to start on the user device. The context can be determined based on information concerning a specific TV show, TV series, or a sport program the user requests to play on the user device. The context can be determined based on a type of TV show the user is currently watching, for example, shows concerning cars, sports, fishing, home and garden improvement, drama, comedy, documentary, and so forth. The context can be determined based on the type of the user device the user 120 communicates with via the voice assistant 130, for example a TV set, a smartphone, or a smart home device. The context can be determined based on a type of activity of the user 120 during voice communications with the user device, for example, whether the user is walking, running, exercising, or resting.

In certain embodiments, the voice command can be sent to the remote advertisement platform 170 as an audio file. In these cases, the remote advertisement platform 170 may perform text recognition and determine the context associated with the voice command. In some embodiments, the remote advertisement platform 170 may perform analysis of the audio file to determine user emotions, potential illness, and a noise background. The selection of an advertisement offer can be adjusted based on the emotion of the user, the health status of the user, and the noise background. In some embodiments, the remote advertisement platform 170 can determine, based on the audio file of the voice command, a voice fingerprint of the user 120. The voice fingerprint can be used by the remote advertisement platform 170 to determine whether the same user has been already presented with the selected advertisement offer. In this case, the remote advertisement platform 170 can search for historical data of interactions of the user 120 with advertisement offers and select, based on the historical data, another advertisement offer from advertisement offers currently stored on the remote advertisement platform 170.

The advertisement offers can be stored by the remote advertisement platform 170 for a pre-determined period, for example a time specified by an advertisement provider or a service provider. When the time is expired, the advertisement offers are removed by the remote advertisement platform 170, so the advertisement offers are no longer offered to the user 120.

Figure 4:
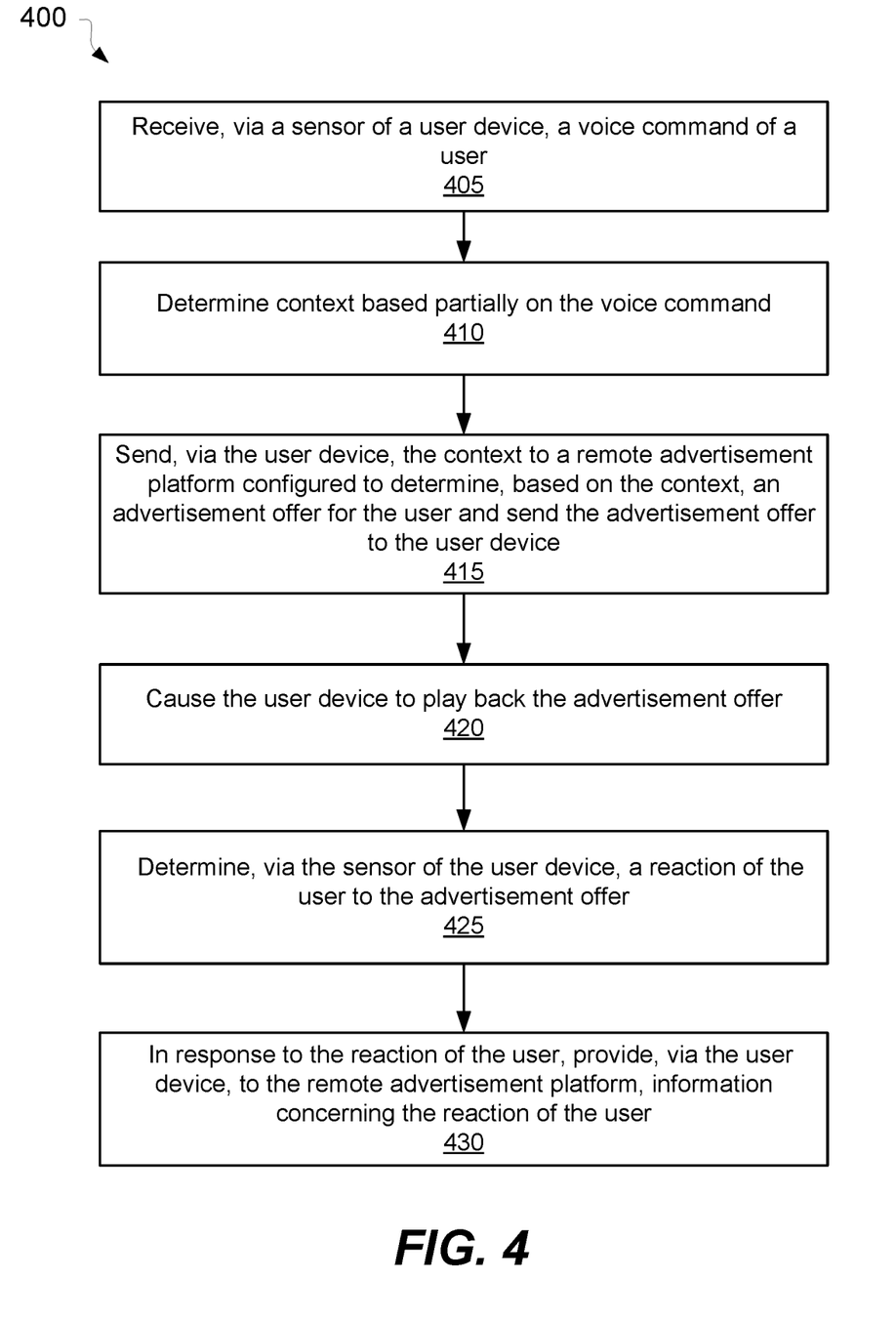
FIG. 4 is a flow chart showing a method for providing context-based advertisement offers, according to an example embodiment.

FIG. 4 is a flow chart showing a method 400 for context-based advertisement offers, according to an example embodiment. The method 400 can be implemented by using the system 100 shown in FIG. 1 and FIG. 3. For example, the method 400 can be implemented as instructions stored in memory of the user device 110 which when being executed by the processors of the user device causing the user device to perform the operations of the method 400. In some embodiments, the operations of method 400 may be combined, performed in parallel, or performed in a different order. The method 400 may also include additional or fewer operations than those illustrated.

The method 400 may commence in block 405 with receiving, via a sensor of a user device, a voice command of a user. The voice command can be related to a media stream application installed on the user device. The user device may include one of the following: a smart television set, a media streaming device, a smart home device, and a smart home assistant device.

In block 410, the method 400 may include determining, based partially on the voice command, a context associated with the voice command of the user. The context is related to one or more of the following: a name of the media stream application, a type of media content to be played via the media stream application, and a title of the media content. The context may also include data concerning an environment background captured by the sensor of the user device.

The determination of the context may also include determining, based on the voice command of the user, one of the following: an emotional level of the user, a range of an age of the user, a gender of the user, and data concerning a health status of the user.

In block 415, the method 400 may include sending, via the user device, the context to a remote advertisement platform. The remote advertisement platform can be configured to determine, based on the context, an advertisement offer for the user and send the advertisement offer to the user device. The advertisement offer may include one or more of the following: an audio record, a text banner, and a companion video. The text banner may include a clickable link.

In block 420, the method 400 may include causing the user device to play back the advertisement offer. The advertisement offer can be played prior to executing, by the user device, an application in response to the voice command of the user. The advertisement offer can be played, by the user device, simultaneously with executing an application, for example playing a move, a series, or a sporting game, in response to the voice command of the user.

In block 425, the method 400 may include determining, via the sensor of the user device, a reaction of the user to the advertisement offer. Determination of the reaction of the user to the advertisement offer may include determining, via the sensor of the user device, one of the following: a voice confirmation of the user to accept the advertisement offer, a voice response of the user to reject the advertisement offer, and absence of a further voice command of the user during a pre-determined time after the advertisement offer has been played.

In some embodiments, the determination of the reaction of the user to the advertisement offer may include capturing, via the sensor of the user device, a voice response of the user. In this case, the information concerning the reaction of the user sent to the remote advertisement platform may include the voice response. The voice response can be further analyzed by the remote advertisement platform to determine the reaction of the user.

In certain embodiments, the determination of the reaction of the user to the advertisement offer may include capturing, via the sensor of the user device, a voice response of the user and recognizing a text in the voice response. In this case, the information concerning the reaction of the user sent to the remote advertisement platform may include the recognized text.

In block 430, in response to the reaction of the user, the method 400 may include providing, via the user device to the remote advertisement platform, information concerning the reaction of the user. In some embodiments, the method 400 may also include determining, based on the reaction of the user, that the user has rejected the advertisement offer. In response to the determination that user has rejected the advertisement offer, the method 400 may include causing the user device to play back a question concerning a reason for the rejection of the advertisement offer. The method 400 may include capturing, via the sensor of the user device, a user response to the question. The method 400 may include sending the user response, via the user device, to the remote advertisement platform, wherein the remote advertisement platform is configured to adjust, based on the user response, an algorithm for selection of the advertisement offer.

Figure 5:
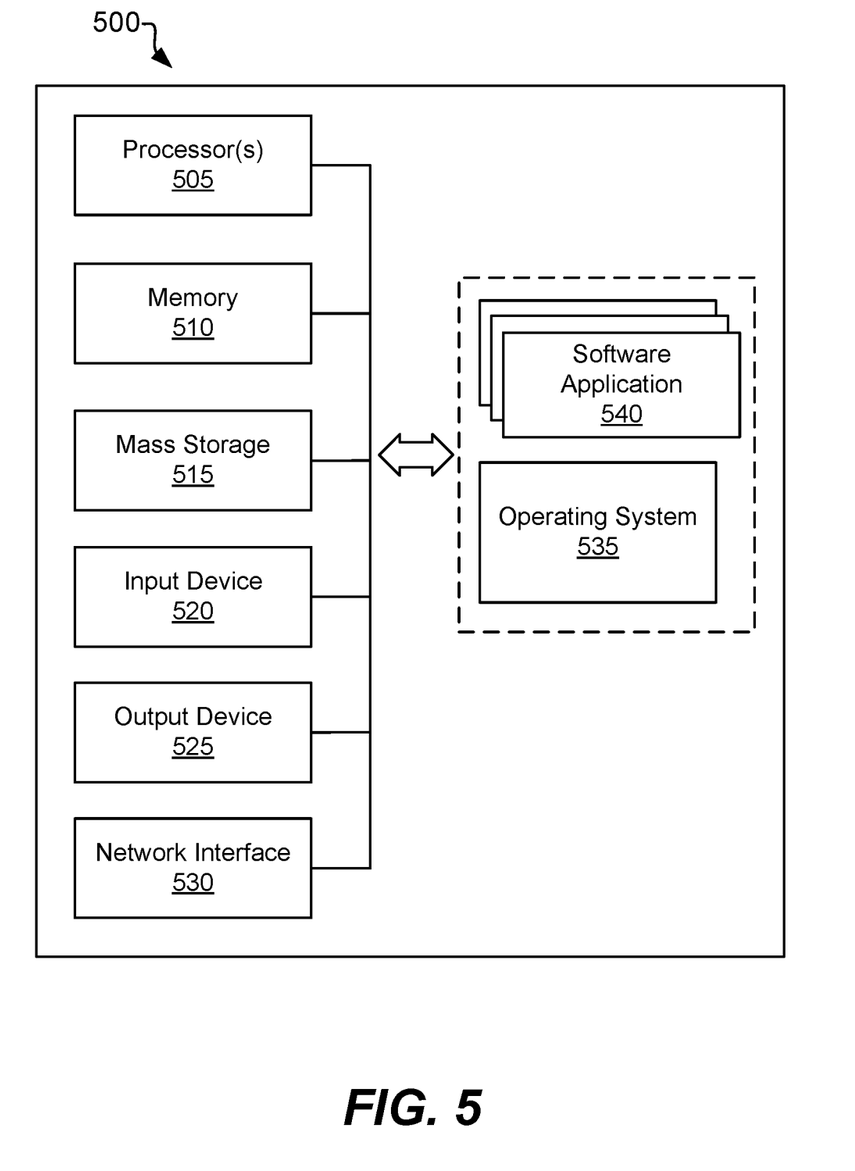
FIG. 5 is a high-level block diagram illustrating an example computer system, within which a set of instructions for causing the machine to perform any one or more of the methodologies discussed herein can be executed.

FIG. 5 is a high-level block diagram illustrating an example computer system 500, within which a set of instructions for causing the machine to perform any one or more of the methodologies discussed herein can be executed. The computer system 500 may include, refer to, or be an integral part of, one or more of a variety of types of devices, such as a general-purpose computer, desktop computer, laptop computer, tablet computer, netbook, mobile phone, smartphone, personal digital computer, smart television device, and server, among others. In some embodiments, the computer system 500 is an example of user device(s) 110 or remote computer resource(s) 130. Notably, FIG. 5 illustrates just one example of the computer system 500 and, in some embodiments, the computer system 500 may have fewer elements/modules than shown on FIG. 5 or more elements/modules than shown on FIG. 5.

The computer system 500 includes one or more processors 505, a memory 510, one or more storage devices 515, one or more input devices 520, one or more output devices 525, and network interface 530. One or more processors 505 are, in some examples, configured to implement functionality and/or process instructions for execution within the computer system 500. For example, the processors 505 may process instructions stored in memory 510 and/or instructions stored on storage devices 515. Such instructions may include components of an operating system 535 or software applications 540. Computer system 500 may also include one or more additional components not shown in FIG. 5, such as a housing, power supply, battery, global positioning system (GPS) receiver, and so forth.

Memory 510, according to one example, is configured to store information within the computer system 500 during operation. Memory 510, in some example embodiments, may refer to a non-transitory computer-readable storage medium or a computer-readable storage device. In some examples, memory 510 is a temporary memory, meaning that a primary purpose of memory 510 may not be long-term storage. Memory 510 may also refer to a volatile memory, meaning that memory 510 does not maintain stored contents when memory 510 is not receiving power. Examples of volatile memories include random access memories (RAM), dynamic random-access memories (DRAM), static random-access memories (SRAM), and other forms of volatile memories known in the art. In some examples, memory 510 is used to store program instructions for execution by the processors 505. Memory 510, in one example, is used by software (e.g., the operating system 535 or applications 540). Generally, software applications 540 refer to software applications suitable for implementing at least some operations of the methods for providing a location-based gaming experience as described herein.

One or more storage devices 515 can also include one or more transitory or non-transitory computer-readable storage media and/or computer-readable storage devices. In some embodiments, storage devices 515 may be configured to store greater amounts of information than memory 510. Storage devices 515 may further be configured for long-term storage of information. In some examples, the storage devices 515 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 5, the computer system 500 may also include one or more input devices 520. The input devices 520 may be configured to receive input from a user through tactile, audio, video, or biometric channels. Examples of input devices 520 may include a keyboard, keypad, mouse, trackball, touchscreen, touchpad, microphone, one or more video cameras, image sensors, fingerprint sensors, or any other device capable of detecting an input from a user or other source and relaying the input to computer system 500, or components thereof.

The output devices 525, in some examples, may be configured to provide output to a user through visual or auditory channels. Output devices 525 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. Output devices 525 may also include a touchscreen, presence-sensitive display, or other input/output capable displays known in the art.

The computer system 500, in some example embodiments, also includes network interface 530. The network interface 530 can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, among others. The network interface 530 may be a network interface card, such as an Ethernet card, an optical transceiver, a radio frequency transceiver, or any other type of device that can send and receive information.

The operating system 535 may control one or more functionalities of computer system 500 and/or components thereof. For example, the operating system 535 may interact with the applications 540 and may facilitate one or more interactions between the applications 540 and components of the computer system 500. As shown in FIG. 5, the operating system 535 may interact with or be otherwise coupled to the application(s) 540 and components thereof. In some embodiments, application(s) 540 may be included in operating system 535. In these and other examples, virtual modules, firmware, or software may be part of the applications 540.

Thus, methods of and systems for context-based voice-related advertisement offers have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for providing context-based advertisement offers, the system comprising:
   a user device including an acoustic sensor configured to sense an ambient acoustic signal; and
   one or more processors communicatively coupled to the user device and the acoustic sensor, the one or more processors being configured to:
   analyze the ambient acoustic signal to determine that a user has spoken a voice command;
   determine, based partially on the voice command, a context;
   send, via the user device, the context and a record of the voice command of the user to a remote advertisement platform, wherein the remote advertisement platform incudes a memory and a further processor, wherein the memory is configured to store a list of advertisement offers and the further processor is configured to:
   determine, based on the context, an advertisement offer for the user, wherein determining the advertisement offer includes:
   determining a previous purchase initiated by the user in connection with the context and selecting, from the list of advertisement offers, the advertisement offer based on the previous purchase;
   determining, based on the record of the voice command of the user, that the user has been previously presented with the advertisement offer; and
   in response to the determination that the user has been previously presented with the advertisement offer, replacing the advertisement offer with a further advertisement offer from the list of advertisement offers; and
   send the advertisement offer to the user device;
   cause the user device to play back the advertisement offer;
   determine, via the acoustic sensor of the user device, a reaction of the user to the advertisement offer; and
   in response to the reaction of the user, provide, via the user device to the remote advertisement platform, information concerning the reaction of the user.

2. The system of claim 1, wherein determining a reaction of the user to the advertisement offer includes determining, via the acoustic sensor of the user device one of the following: a voice confirmation of the user to accept the advertisement offer, a voice response of the user to reject the advertisement offer, and absence of a further voice command of the user during a pre-determined time after the advertisement offer has been played.

3. The system of claim 1, wherein the voice command is related to a media stream application installed on the user device and the context is related to one or more of the following: a name of the media stream application, a type of media content to be played via the media stream application, and a title of the media content.

4. The system of claim 1, wherein the context includes data concerning an environment background captured by the acoustic sensor of the user device.

5. The system of claim 1, wherein the determining the context includes determining, based on the voice command of the user, one of the following: an emotional level of the user, a range of an age of the user, a gender of the user, a voice fingerprint of the user, and data concerning a health status of the user.

6. The system of claim 1, wherein the one or more processors are configured to:
   determine, based on the reaction of the user, that the user has rejected the advertisement offer; and
   in response to the determination:
   cause the user device to play back a question concerning a reason for the rejection of the advertisement offer;
   capture, via the acoustic sensor of the user device, a user response to the question; and
   send, via the user device, to the remote advertisement platform, the user response, wherein the the further processor is configured to adjust, based on the user response, an algorithm for selection of the advertisement offer.

7. The system of claim 1, wherein:
   the determining the reaction of the user to the advertisement offer includes capturing, via the acoustic sensor of the user device, a voice response of the user; and
   the information concerning the reaction of the user includes the voice response.

8. The system of claim 1, wherein:
   the determining the reaction of the user to the advertisement offer includes:

capturing, via the acoustic sensor of the user device, a voice response of the user; and recognizing a text in the voice response; and the information concerning the reaction of the user includes the recognized text.

9. The system of claim 1, wherein the user device includes one of the following: a smart television set, a media streaming device, a smart home device, a car, and a smart home assistant device.

10. The system of claim 1, wherein the advertisement offer includes one or more of the following: an audio record, a text, a companion display banner, and a companion video.

11. A method for providing context-based advertisement offers, the method comprising:

analyzing, by one or more processors, an ambient acoustic signal to determine that a user has spoken a voice command, wherein the ambient acoustic signal is sensed by an acoustic sensor of a user device communicatively coupled to the one or more processors;

determining, by the one or more processors and based partially on the voice command, a context;

sending, by the one or more processors and via the user device, the context and a record of the voice command of the user to a remote advertisement platform, wherein the remote advertisement platform incudes a memory and a further processor, wherein the memory is configured to store a list of advertisement offers and the further processor is configured to:

determine, based on the context, an advertisement offer for the user, wherein determining the advertisement offer includes:

determining a previous purchase initiated by the user in connection with the context and selecting, from the list of advertisement offers, the advertisement offer based on the previous purchase;

determining, based on the record of the voice command of the user, that the user has been previously presented with the advertisement offer; and in response to the determination that the user has been previously presented with the advertisement offer, replacing the advertisement offer with a further advertisement offer from the list of advertisement offers; and send the advertisement offer to the user device;

causing, by the one or more processors, the user device to play back the advertisement offer;

determining, by the one or more processors and via the acoustic sensor of the user device, a reaction of the user to the advertisement offer; and in response to the reaction of the user, providing, via the user device to the remote advertisement platform, information concerning the reaction of the user.

12. The method of claim 11, wherein determining a reaction of the user to the advertisement offer includes determining, via the acoustic sensor of the user device one of the following: a voice confirmation of the user to accept the advertisement offer, a voice response of the user to reject the advertisement offer, and absence of a further voice command of the user during a pre-determined time after the advertisement offer has been played.

13. The method of claim 11, wherein the voice command is related to a media stream application installed on the user device and the context is related to one or more of the following: a name of the media stream application, a type of media content to be played via the media stream application, and a title of the media content.

14. The method of claim 11, wherein the context includes data concerning an environment background captured by the acoustic sensor of the user device.

15. The method of claim 11, wherein the determining context includes determining, based on the voice command of the user, one of the following: an emotional level of the user, a range of an age of the user, a gender of the user, a voice fingerprint of the user, and data concerning a health status of the user.

16. The method of claim 11, further comprising:

determining, by the one or more processors and based on the reaction of the user, that the user has rejected the advertisement offer; and in response to the determination:

causing, by the one or more processors, the user device to play back a question concerning a reason for the rejection of the advertisement offer;

capturing, by the one or more processors and via the acoustic sensor of the user device, a user response to the question; and sending, by the one or more processors via the user device to the remote advertisement platform, the user response, wherein the further processor is configured to adjust, based on the user response, an algorithm for selection of the advertisement offer.

17. The method of claim 11, wherein:

the determining the reaction of the user to the advertisement offer includes capturing, via the acoustic sensor of the user device, a voice response of the user; and the information concerning the reaction of the user includes the voice response.

18. The method of claim 11, wherein:

the determining the reaction of the user to the advertisement offer includes:

capturing, by the one or more processors and via the acoustic sensor of the user device, a voice response of the user; and recognizing, by the one or more processors, a text in the voice response; and the information concerning the reaction of the user includes the recognized text.

19. The method of claim 11, wherein the user device includes one of the following: a smart television set, a media streaming device, a smart home device, a car, and a smart home assistant device.

20. A non-transitory processor-readable medium having instructions stored thereon, which when executed by one or more processors, cause the one or more processors to implement a method for providing context-based advertisement offers, the method comprising:

analyzing an ambient acoustic signal to determine that a user has spoken a voice command of a user, wherein the ambient acoustic signal is sensed by an acoustic sensor of a user device;

determining, based partially on the voice command, a context;

sending, via the user device, the context and a record of the voice command of the user to a remote advertisement platform, wherein the remote advertisement platform incudes a memory and a further processor, wherein the memory is configured to store a list of advertisement offers and the further processor is configured to:

determine, based on the context, an advertisement offer for the user, wherein determining the advertisement offer includes:

determining a previous purchase initiated by the user in connection with the context and selecting, from the list of advertisement offers, the advertisement offer based on the previous purchase;

determining, based on the record of the voice command of the user, that the user has been previously presented with the advertisement offer; and in response to the determination that the user has been previously presented with the advertisement offer, replacing the advertisement offer with a further advertisement offer from the list of advertisement offers; and send the advertisement offer to the user device;

causing the user device to play back the advertisement offer;

determining, via the acoustic sensor of the user device, a reaction of the user to the advertisement offer; and in response to the reaction of the user, providing, via the user device to the remote advertisement platform, information concerning the reaction of the user.

* * * * *